(12) United States Patent
Shouji

(10) Patent No.: US 6,912,519 B2
(45) Date of Patent: Jun. 28, 2005

(54) COMPUTER PROGRAM AND METHOD FOR SENDING RECIPIENT-ORIENTED ELECTRONIC MAIL MESSAGES

(75) Inventor: Takeshi Shouji, Toyama (JP)

(73) Assignee: Fujitsu Limited, Kawasaki (JP)

( * ) Notice: Subject to any disclaimer, the term of this patent is extended or adjusted under 35 U.S.C. 154(b) by 825 days.

(21) Appl. No.: 09/941,573

(22) Filed: Aug. 30, 2001

(65) Prior Publication Data

US 2002/0103870 A1 Aug. 1, 2002

(30) Foreign Application Priority Data

Jan. 26, 2001 (JP) ......................................... 2001-018650

(51) Int. Cl.⁷ .............................................. G06F 15/16
(52) U.S. Cl. ..................................................... 706/206
(58) Field of Search ................................. 709/206, 207, 709/245, 203, 238; 704/2, 8; 379/93.01; 715/523, 531, 536

(56) References Cited

U.S. PATENT DOCUMENTS

| | | | | |
|---|---|---|---|---|
| 5,960,080 A | * | 9/1999 | Fahlman et al. ............ 380/252 |
| 6,301,554 B1 | * | 10/2001 | Christy ......................... 704/7 |
| 6,757,739 B1 | * | 6/2004 | Tomm et al. ............... 709/236 |
| 6,816,884 B1 | * | 11/2004 | Summers .................... 709/206 |
| 2002/0004822 A1 | * | 1/2002 | Azuma ........................ 709/206 |
| 2002/0029300 A1 | * | 3/2002 | Okada et al. ............... 709/318 |
| 2002/0188670 A1 | * | 12/2002 | Stringham .................. 709/203 |

FOREIGN PATENT DOCUMENTS

JP     10149361 A     6/1998

\* cited by examiner

Primary Examiner—Zarni Maung
Assistant Examiner—Kimberly D. Flynn
(74) Attorney, Agent, or Firm—Staas & Halsey LLP

(57) ABSTRACT

A computer program product which sends an e-mail message to specified destinations after modifying the wordings used in the message according to the social relationship between the sender and recipient. An address management unit manages addresses of e-mail recipients in association with their social relationships with the sender. A message data reception unit receives a source message, and a recipient identifier reception unit receives recipient identification data which identifies at least one e-mail recipient specified as the destination of the message. A social relation identification unit identifies the social relationship between the sender and the identified recipient, comparing the received recipient identification data with the address data being managed by the address management unit. A message rewriting unit rewrites the source message according to the social relationship identified by the social relation identification unit.

5 Claims, 19 Drawing Sheets

| | |
|---|---|
| ADDRESS #1: | ceo@a.com |
| NAME: | JOUSHI KAZUO |
| RELATION: | BOSS |
| ADDRESS #2: | coworker@b.com |
| NAME: | TAKEDA TATSUO |
| RELATION: | COLLEGUE |
| ADDRESS #3: | henchman@c.com |
| NAME: | YAMANAKA ISSEI |
| RELATION: | SUBORDINATE |
| ⋮ | |
| ADDRESS #n: | relatives@d.com |
| NAME: | EGAWA TAKAKO |
| RELATION: | RELATIVE |

FIG. 7

(Izen kara keikaku shite ita toori, honjitsu, honsha nikai shokudou de, risshokukeishiki no party wo okonau node, kanarazukoiyo. Nao, ore wa tugou niyori okurete iku.)

100 CONVERSION TABLE

| No. | REWRITE CLASS 1 | REWRITE CLASS 2 | REWRITE CLASS 3 |
|---|---|---|---|
| 001 | わたくし (watakushi) | ぼく (boku) | おれ (ore) |
| 002 | おります (orimasu) | います (imasu) | いる (iru) |
| 003 | おりました (orimashita) | いました (imashita) | いた (ita) |
| 004 | いただきます (itadakimasu) | たべます (tabemasu) | たべる (taberu) |
| 005 | はいけんします (haikenshimasu) | みます (mimasu) | みる (miru) |
| 006 | おてがみ (otegami) | てがみ (tegami) | てがみ (tegami) |
| 007 | おこしください (okoshikudasai) | きてください (kitekudasai) | こい (koi) |
| 008 | おこないます (okonaimasu) | おこないます (okonaimasu) | おこなう (okonau) |
| 009 | まいります (mairimasu) | いきます (ikimasu) | いく (iku) |
| ⋮ | ⋮ | ⋮ | ⋮ |
| 100 | おきゃくさま (okyakusama) | おきゃく (okyaku) | きゃく (kyaku) |

140 CONVERSION TABLE

| No. | REWRITE CLASS 1 | REWRITE CLASS 2 | REWRITE CLASS 3 |
|---|---|---|---|
| 001 | For what is worth, | For what is worth, | FWIW |
| 002 | In my humble opinion, | In my humble opinion, | IMHO |
| 003 | I hope this helps. | I hope this helps. | HTH |
| 005 | As far as I know, | As far as I know, | AFAIK |
| ... | ... | ... | ... |
| 147 | businessperson | businessman | businessman |
| 148 | salesperson | salesman | salesman |
| 149 | chairperson | chairman | chairman |
| 150 | flight attendant | stewardess | stewardess |
| ... | ... | ... | ... |

COMPUTER PROGRAM AND METHOD FOR SENDING RECIPIENT-ORIENTED ELECTRONIC MAIL MESSAGES

BACKGROUND OF THE INVENTION

1. Field of the Invention

The present invention relates to a method of sending electronic mail (e-mail) messages, as well as to a computer program product therefor and a computer-readable medium storing that computer program. More particularly, the present invention relates to a method of sending e-mail messages to specified recipients. The invention further relates to a computer program product that implements the e-mail message sending method, as well as to a computer-readable medium storing the computer program product.

2. Description of the Related Art

When writing an e-mail message to someone, one chooses appropriate wordings and tones for effective communication, taking into consideration his/her social relationship with the recipient. For example, the hierarchical structure of an organization to which they belong is considered, as is their difference in age. Because this is a troublesome task, people have to expend much effort in creating e-mail messages in their social life.

The above problem would become more serious when one should send the same message to two or more people having different social relationships with him/her. In this case, the sender must rewrite the original text for each individual recipient.

SUMMARY OF THE INVENTION

In view of the foregoing, it is an object of the present invention to provide a computer program product designed to help a sender to reword or rewrite an e-mail message considering his/her social relationship with the specified recipient of that message. It is also an object of the present invention to provide a computer-readable medium storing such a computer program product and a method of sending such recipient-oriented e-mail messages.

To accomplish the above objects, according to the present invention, there is provided a computer program product which enables a computer to send electronic mail (e-mail) messages from a sender to specified destinations. This computer program product causes the computer to function as the following mechanisms: an address management unit which manages addresses of e-mail recipients in association with the recipients' social relationships with the sender; a message data reception unit which receives a source message; a recipient identifier reception unit which receives recipient identification data which identifies at least one e-mail recipient specified as the destination; a social relation identification unit which identifies the social relationship between the sender and the identified e-mail recipient, by comparing the received recipient identification data with the addresses being managed by the address management unit; and a message rewriting unit which rewrites the source message according to the social relationship identified by the social relation identification unit.

Further, to accomplish the above objects, according to the present invention, there is provided a computer-readable medium storing a program which sends electronic mail (e-mail) messages from a sender to specified destinations. This program causes a computer to function as the following mechanisms: an address management unit which manages addresses of e-mail recipients in association with the recipients' social relationships with the sender; a message data reception unit which receives a source message; a recipient identifier reception unit which receives recipient identification data which identifies at least one e-mail recipient specified as the destination; a social relation identification unit which identifies the social relationship between the sender and the identified e-mail recipient, by comparing the received recipient identification data with the addresses being managed by the address management unit; and a message rewriting unit which rewrites the source message according to the social relationship identified by the social relation identification unit.

Moreover, to accomplish the above objects, according to the present invention, there is provided a method of sending electronic mail (e-mail) messages from a sender to specified destinations. This method comprises the following steps: (a) managing addresses of e-mail recipients in association with the recipients' social relationships with the sender; (b) receiving a source message; (c) receiving recipient identification data which identifies at least one e-mail recipient specified as the destination; (d) identifying social relationships between the sender and the identified e-mail recipient, by comparing the received recipient identification data with the addresses being managed at said step (a) of managing the addresses; and (e) rewriting the source message according to the social relationship identified at said step (d) of identifying the social relationship.

The above and other objects, features and advantages of the present invention will become apparent from the following description when taken in conjunction with the accompanying drawings which illustrate preferred embodiments of the present invention by way of example.

BRIEF DESCRIPTION OF THE DRAWINGS

FIG. 7 shows an example of an address book structure according to the present invention;

FIG. 13 shows an example of a conversion table for Japanese language messages;

FIG. 17 shows an example of a conversion table for English language messages.

DESCRIPTION OF THE PREFERRED EMBODIMENTS

Preferred embodiments of the present invention will be described below with reference to the accompanying drawings.

Figure 1:
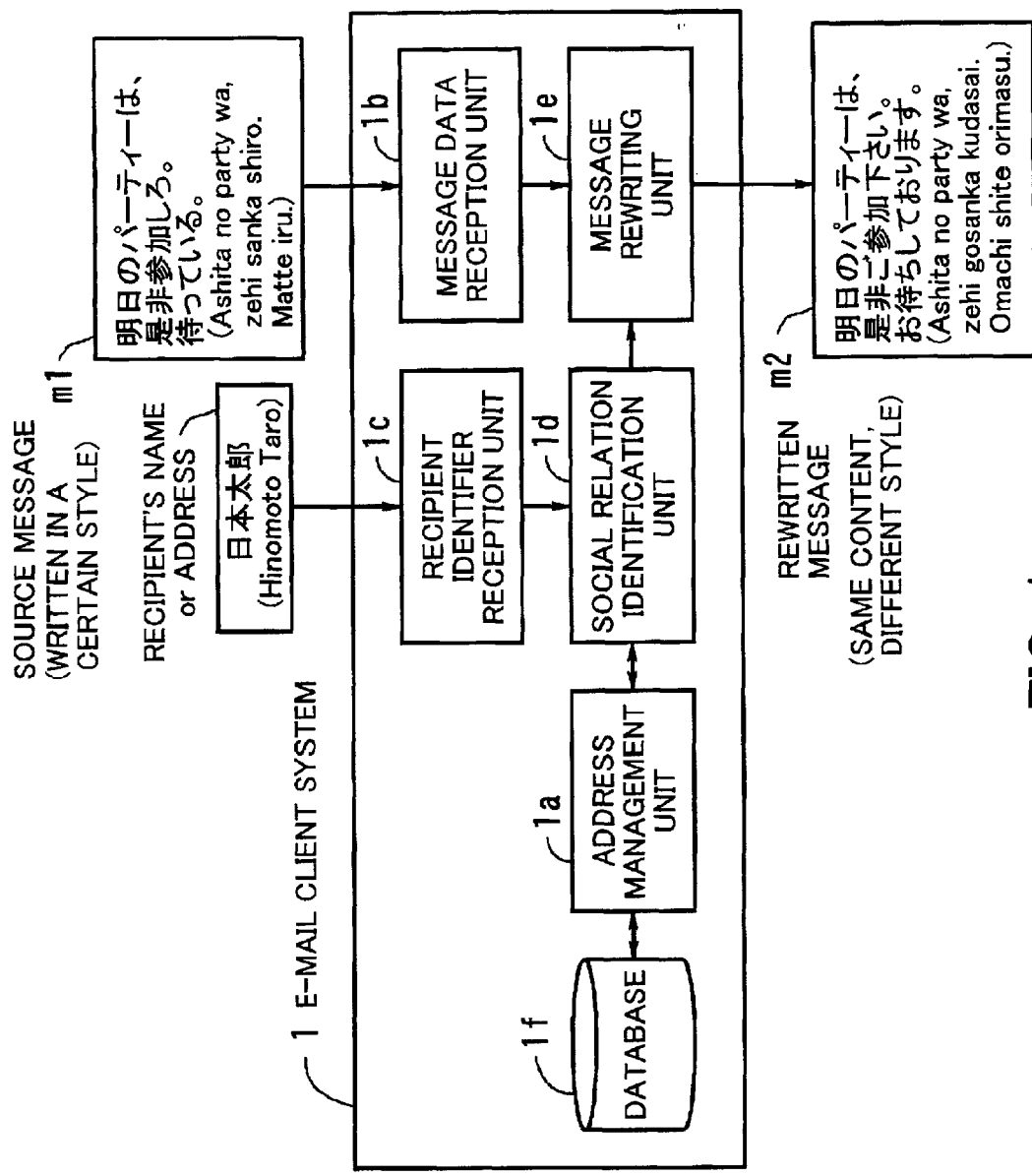
FIG. 1 is a conceptual view of the present invention.

FIG. 1 is a conceptual view of an e-mail client system 1 according to the present invention. This e-mail client system 1 comprises the following elements: an address management unit 1a, a message data reception unit 1b, a recipient identifier reception unit 1c, a social relation identification unit 1d, a message rewriting unit 1e, and a database 1f.

The address management unit 1a manages addresses of potential e-mail recipients in association with their social relationships with the sender. The message data reception unit 1b receives a source message. The recipient identifier reception unit 1c receives recipient identification data which identifies at lease one e-mail recipient specified as the destination of the message. The social relation identification unit id identifies the social relationship between the sender and the identified e-mail recipient, comparing the received recipient identification data with the address data being managed by the address management unit 1a. The message rewriting unit 1e rewrites the source message according to the social relationship identified by the social relation identification unit 1d.

The above e-mail client system 1 operates as follows. First, a source message, or e-mail content, is given to the message data reception unit 1b. FIG. 1 shows an example of a source message m1 written in Japanese, which reads as follows: "Ashita no party wa, zehi sanka siro. Matte iru." (Note that this is a Romanized representation, or transliteration, of the original Japanese message m1 shown in FIG. 1, which is actually composed of various kinds of characters including Chinese characters.) This example message m1, written in an informal style, is intended to encourage the recipient to attend a certain party event. The message data reception unit 1b accepts such a source message m1 and passes it to the message rewriting unit 1e.

The recipient identifier reception unit 1c, on the other hand, receives specific data that permits the e-mail client system 1 to identify who the intended recipients are. In the example of FIG. 1, it receives one recipient name "Hinomoto Taro" (again, this is a Romanized expression of a Japanese name). The recipient identifier reception unit 1c supplies this recipient identification data to the social relation identification unit 1d. The social relation identification unit 1d then interacts with the address management unit 1a in an attempt to identify what type of social relationship the sender has with the recipient, i.e., "Hinomoto Taro" in the present case. Suppose, for example, that the recipient "Hinomoto Taro" is the sender's boss in their organization. This information is supplied from the social relation identification unit 1d to the message rewriting unit 1e.

In the context of FIG. 1, assuming a typical company or other organization in Japan, the employees are supposed to use polite wordings when they talk or write to their superiors. In this aspect, the writing style of the source message m1 in the example of FIG. 1 is inappropriate, and thus the sender has to rewrite it using a more polite and formal vocabulary. According to the present invention, the message rewriting unit 1e serves this purpose. Consulting the information about the social relationship between the sender and recipient, the message rewriting unit 1e rewrites or rewords the source message m1 so that the intention of the message be delivered to the recipient in a more appropriate way. More specifically, the message rewriting unit 1e replaces the wording "sanka shiro," which has an imperative tone, with another wording "gosanka kudasai," a polite way of inviting the recipient. Likewise, the wording "matte iru" has to be changed to "omachi shite orimasu" to express the anticipation of the sender who is looking forward to seeing the recipient at the party. The message rewriting unit 1e outputs a rewritten message m2 as a result of the processing described above. The sender views the rewritten message m2 and edits it if he/she should do so, and after that, the message m2 is sent out to the destination.

In the way described above, the present invention helps the sender to create a message that conforms to a writing style appropriate for the intended recipient(s). This feature of the present invention is achieved by employing such a mechanism that corrects the message on the basis of the social relationship between the sender and recipient(s). A more specific embodiment of the present invention will be explained in the next section.

Figure 2:
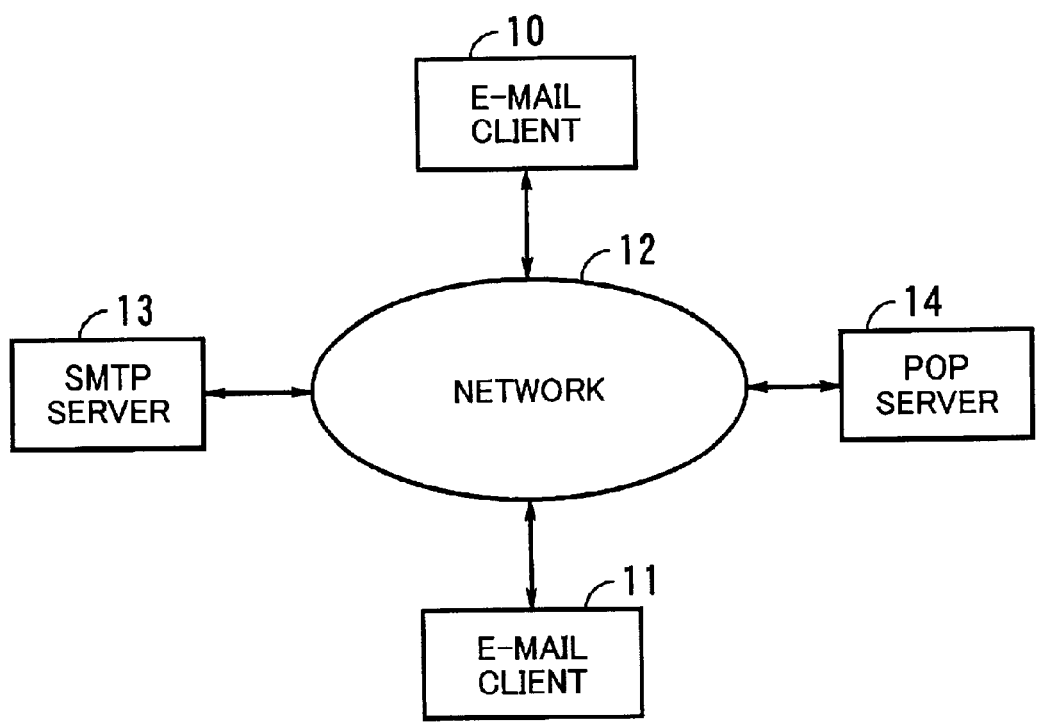
FIG. 2 is a block diagram of a system environment in which the present invention is embodied.

FIG. 2 is a block diagram of a system environment in which the present invention is embodied. FIG. 2 illustrates a system where e-mail clients 10 and 11 are connected to a Simple Mail Transfer Protocol (SMTP) server 13 and a Post Office Protocol (POP) server 14. The e-mail clients 10 and 11 transmits and receives e-mail messages to/from their peer systems, using the mail delivery service of the SMTP server 13 and POP server 14. The network 12, typically the Internet, serves as the data transport medium based on the Transmission Control Protocol/Internet Protocol (TCP/IP) specifications.

The SMTP server 13 accepts outgoing e-mail messages created on the e-mail clients 10 and 11 and directs them to the POP server 14 or any other relaying SMTP servers (not shown) on the network 12. The POP server 14 receives and stores messages sent from the SMTP server 13, and delivers them to their destinations upon request from the e-mail client 10 or 11.

Figure 3:
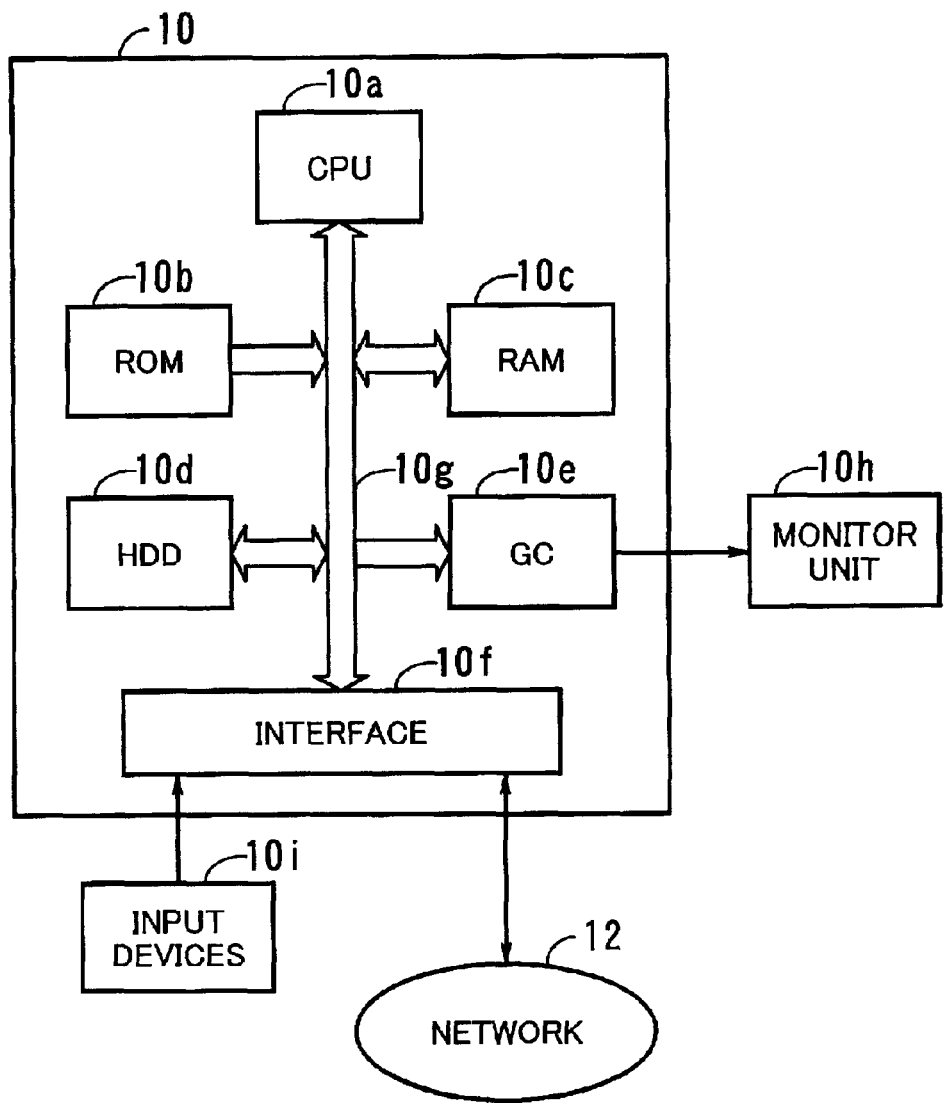
FIG. 3 shows the details of an e-mail client system shown in FIG. 2.

FIG. 3 is a block diagram of a typical hardware platform for the e-mail client 10 shown in FIG. 2, which is for the other e-mail client 11 as well. As FIG. 3 shows, the e-mail client 10 comprises the following components: a central processing unit (CPU) 10a, a read-only memory (ROM) 10b, a random access memory (RAM) 10c, a hard disk drive unit (HDD) 10d, a graphics control card (GC) 10e, an interface 10f, and a bus 10g. The e-mail client 10 operates with an external monitor unit 10h and input devices 10i.

The CPU 10a provides various control functions for other parts of the system according to computer programs and data stored in the HDD 10d, and by doing so, it performs e-mail communication with other peer systems via the SMTP server 13 and POP server 14. The ROM 10b stores basic programs and data that the CPU 10a executes and manipulates. The RAM 10c serves as temporary storage for application programs and scratchpad data that the CPU 10a executes and manipulates at runtime. The HDD 10d stores programs and data that the CPU 10a executes and manipulates. The graphics control card 10e produces image data in accordance with drawing commands from the CPU 10a and provides the monitor unit with the resultant images in the form of video signals.

The interface 10e provides protocol translation services, including data format conversion, to enable the CPU 10a to send and receive data over the network 12. It also converts the format of data received from the input devices 10i. The bus log interconnects the CPU 10a, ROM 10b, RAM 10c, HDD 10d, graphic control card 10e, and interface 10f, permitting them to communicate with each other.

The monitor unit 10h, comprising a video monitor device such as a cathode ray tube (CRT), displays images that the graphics control card 10e supplies in the form of video signals. The input devices 10i include a keyboard and a mouse, for example, with which the message sender enters operating commands to the e-mail client 10. The input devices 10i generate data signals representing such user operations.

Figure 4:
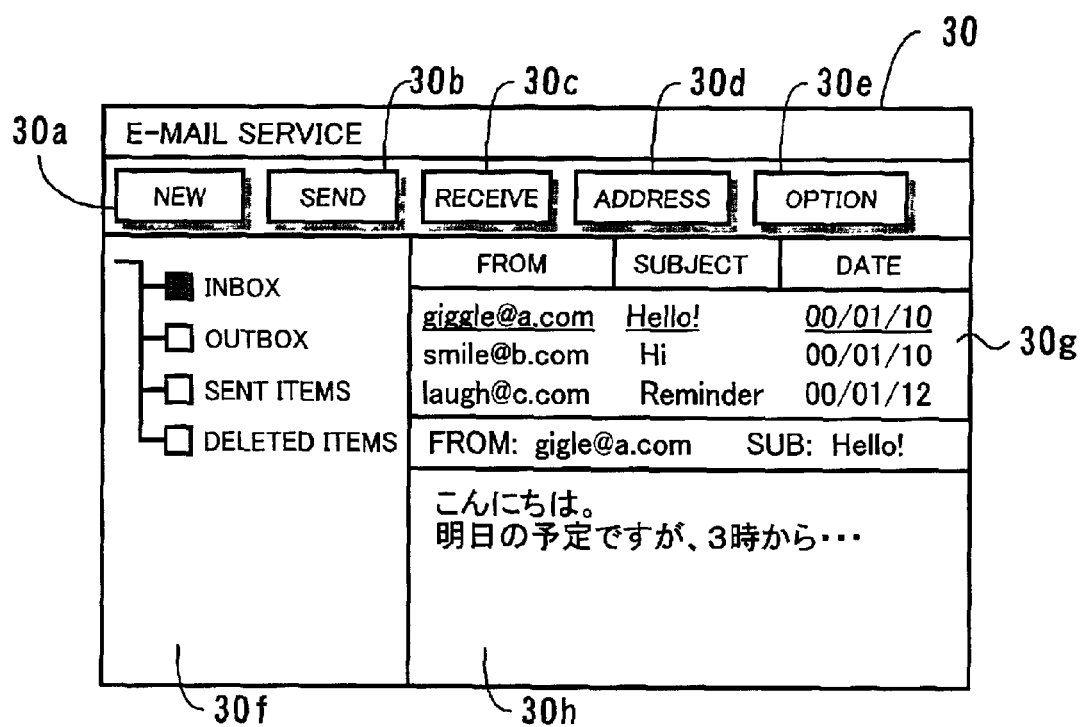
FIG. 4 shows an example window that appears on a monitor screen when an e-mail client application program is activated to send and/or receive messages.

The next section will now explain the operation of the above-described embodiment. Suppose here that the user of the e-mail client 10 is attempting to send an e-mail message. Operating the input devices 10i, the user activates an application program for e-mail communications, causing the CPU 10a to read out relevant program files from the HDD 10d. As a result of this, a window 30 entitled "E-MAIL SERVICE" pops up on the screen of the monitor unit 10h, as shown in FIG. 4. The window 30 is partitioned into three frames 30f, 30g, and 30h.

The frame 30f contains symbols of some folders storing e-mail messages that are to be sent or received, or have been sent or deleted. By selecting a desired folder, the user can view the contents of that folder in the right-hand frames 30g and 30h. In the example of FIG. 4, the checkbox of "Inbox" is selected, the received e-mail messages being listed in the frame 30g. The frame 30h provides the text of a particular e-mail message that is selected from those listen in the frame 30g. In the present example, the topmost message in the list is shown.

The window 30 offers several buttons 30a to 30e for user actions. More specifically, the NEW button 30a is used to create a new e-mail message. The SEND button 30b triggers transmission of messages stored in the Outbox. The RECEIVE button 30c is used to download incoming e-mail messages from the POP server 14. The ADDRESS button 30d opens the address book, allowing the user to edit recipient address entries. The OPTION button 30e is used to display a dialog box where the user can set some options and preferences for the behavior of the application program when it processes given messages.

Figure 5:
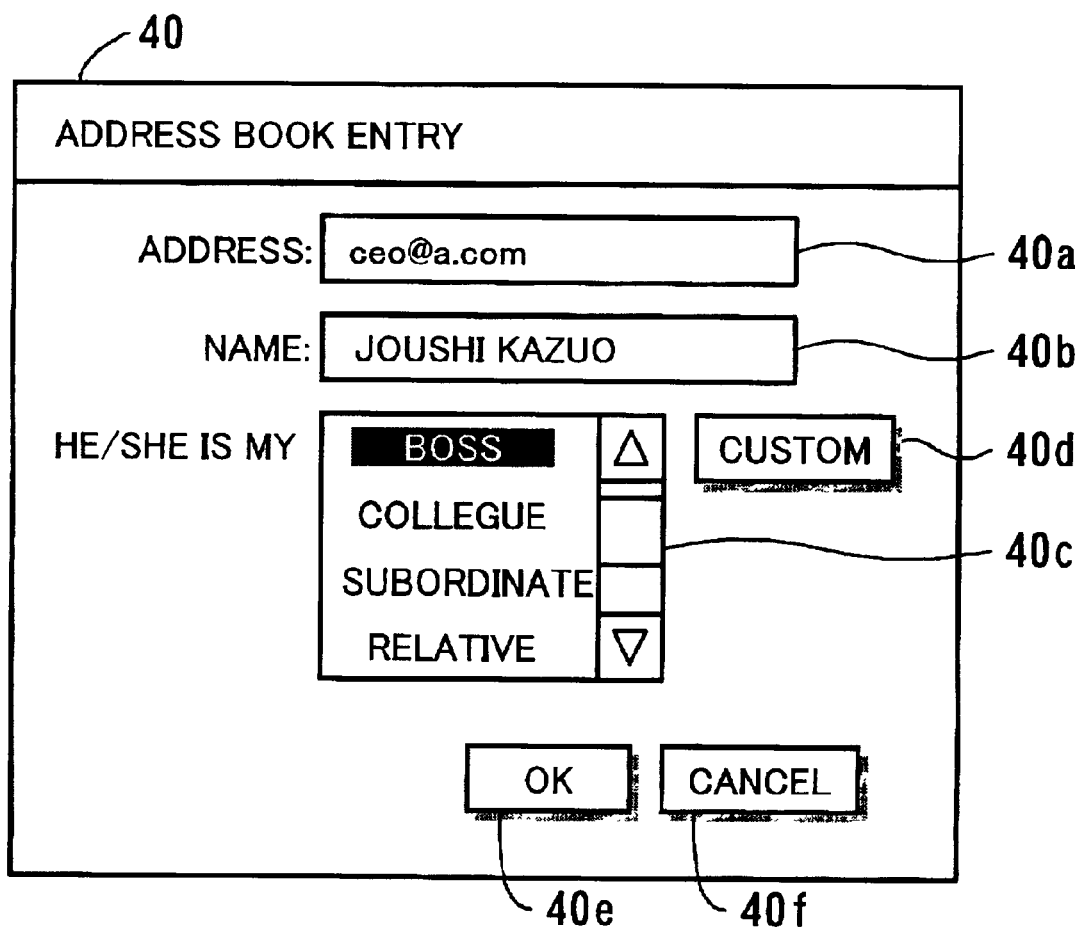
FIG. 5 shows an example dialog box that appears on the screen of FIG. 4 when the user has pressed ADDRESS button 30d in an attempt to edit his/her address book.

Consider that the user has pressed the ADDRESS button 30d in an attempt to put a new address entry into his/her address book. The CPU 10a then reads out the address book from the HDD 10d and supplies the data to the graphic control card 10e. This results in a dialog box appearing on the screen of the monitor unit 10h. FIG. 5 is an example of such a dialog box 40. This dialog box 40, entitled "ADDRESS BOOK ENTRY," contains text boxes 40a and 40b, a list box 40c, and buttons 40d to 40f.

With the dialog box 40, the user defines a new address book entry, entering the recipient's e-mail address and name into the text boxes 40a and 40b, respectively. The list box 40c contains various kinds of predefined sender-recipient relationships, one of which is selected for the recipient specified in the text boxes 40a and 40b. In the example of FIG. 5, the following sender-recipient relationships are available for selection: "BOSS," "COLLEAGUE," "SUBORDINATE," and "RELATIVE."

In the present embodiment, the sender-recipient relationships are categorized into groups called "rewrite classes" for use in the process of rewording. More specifically, there are three rewrite classes, and the relationships "BOSS," "COLLEAGUE," and "SUBORDINATE" fall into rewrite classes 1, 2, and 3, respectively. When the user is unable to find an appropriate relationship in the list box 40c, the CUSTOM button 40d allows him/her to define a new relationship category.

When all necessary data is ready, the user registers it to the address book by pressing the OK button 40e. He/she would otherwise press the CANCEL button 40f to close the dialog box 40 without registering the current data.

Figure 6:
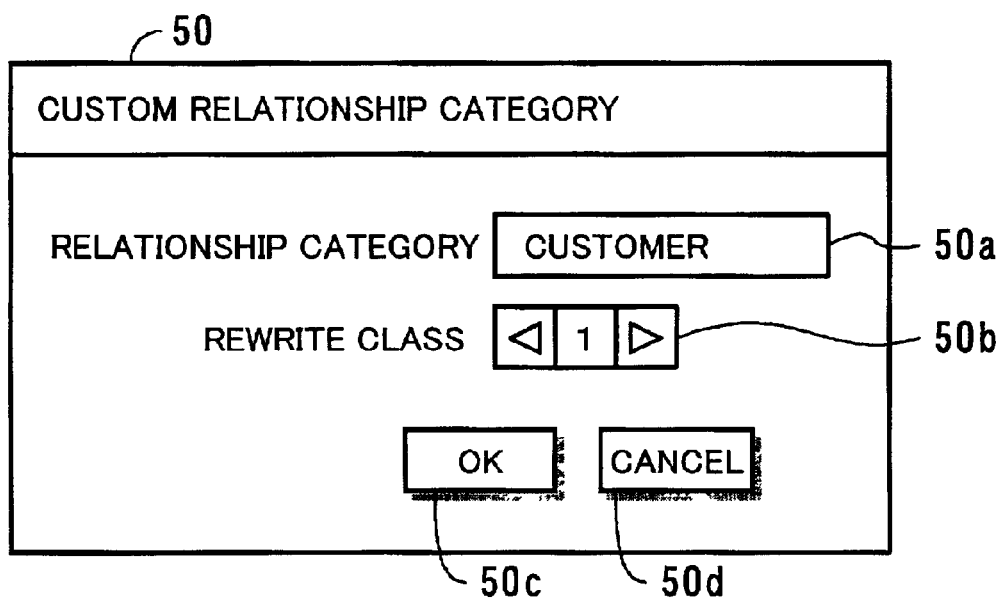
FIG. 6 shows an example dialog box that enables the user to customize the definitions of rewrite classes used in the dialog box of FIG. 5.

FIG. 6 shows an example dialog box that appears when the CUSTOM button 40d is pressed. This dialog box 50, entitled "CUSTOM RELATIONSHIP CATEGORY," has two text boxes 50a and 50b and two buttons 50c and 50d. The first text box 50a is used to label the new relationship. In the present example, a relationship category "CUSTOMER" is defined. The second text box 50b, which is actually a kind of spin box, allows the user to specify the rewrite class of the new relationship category, which takes a value of 1, 2, or 3. In the present example, the highest rewrite class "1" is assigned to the new relationship category "CUSTOMER." The user registers the entered data by pressing the OK button 50c. He/she would otherwise press the CANCEL button 50d to close the dialog box 50 without registering the current data.

The user fills out the items in the dialog boxes of FIGS. 5 and 6 and then presses the button 40e or 50c. This user action causes the CPU 10a to read the items and enters them to the address book, a data area previously allocated in the HDD 10d for the purpose of recipient address management. FIG. 7 shows an example of the address book structure according to the present invention. Each entry of this address book is defined as the following items: the e-mail address of a person (recipient), his/her name, and his/her relationship with the user (sender). Take the topmost entry, for example. This entry describes the e-mail address <ceo@a.com> of Joushi Kazuo, who is the user's boss. The contents of this entry are what the user entered to the ADDRESS BOOK ENTRY dialog box 40 in FIG. 5.

The above section has described how the address book is compiled as a repository for the recipient information. The user can edit existing address book entries at any time, calling up them on the dialog boxes 40 and 50 shown in FIGS. 5 and 6.

Figure 8:
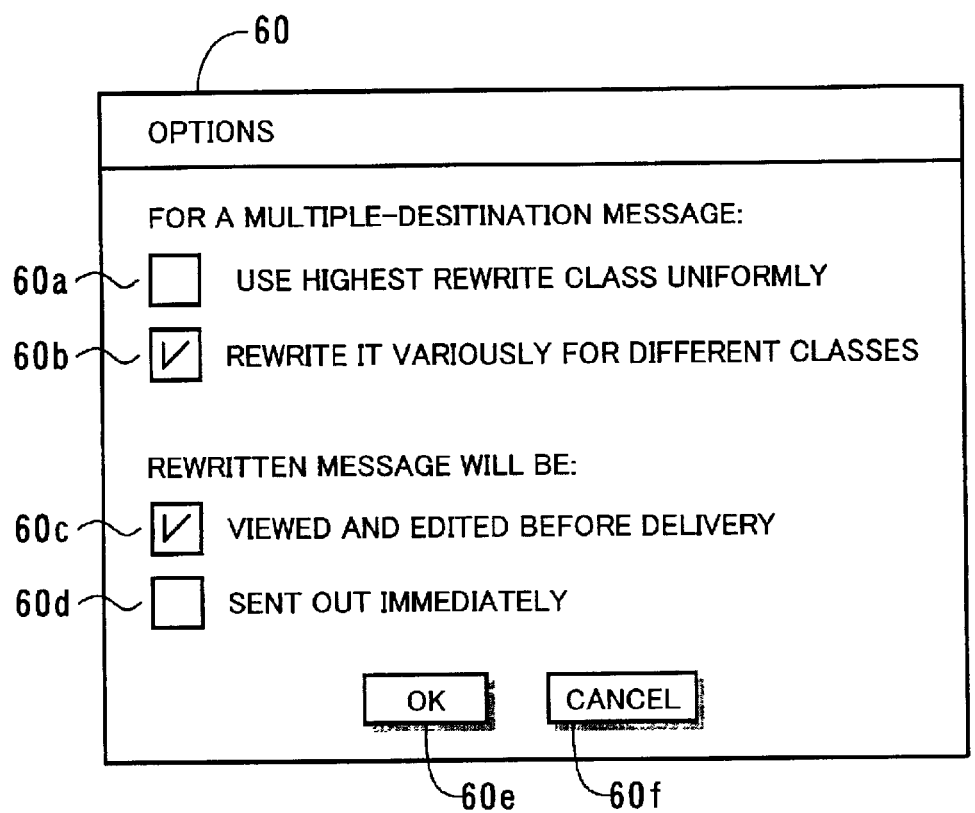
FIG. 8 shows an example dialog box that appears when the user has pressed the OPTION button 30e on the window of FIG. 4 in an attempt to select desired options for operation modes.

Referring now to FIG. 8, the next section will provide an explanation for the operation mode setting function. This function is activated by pressing the OPTION button 30e in FIG. 4. Upon depression of the button 30e, the CPU 10a reads out relevant data from the HDD 10d and supplies it to the graphic control card 10e, thus causing a dialog box 60 entitled "OPTIONS" to pop up on the screen of the monitor unit 10h. FIG. 8 shows an example of this dialog box 60, which contains four check boxes 60a to 60d and two buttons 60e and 60f.

The user places a checkmark in either one of the first two check boxes 60a and 60b to select the option or preference about how to rewrite a multiple-destination message. More specifically, when a message is addressed to two or more destinations, the user may wish to unify the style and tone of the output messages according to the highest rewrite class. In this case, he/she selects the upper check box 60a. Or alternatively, the user may want to rewrite the source message variously for different rewrite classes. In this case, he/she selects the lower check box 60b.

The next two check boxes 60c and 60d provide another operation mode option, i.e., whether to view the rewritten messages before sending them out. More specifically, the user may select the upper check box 60c, wishing to view and edit each rewritten message. Or alternatively, the user may select the lower check box 60d, allowing the e-mail client system to transmit the rewritten messages immediately.

When the selection is finished, the user registers those options by pressing the OK button 60e. He/she would otherwise press the CANCEL button 60f to close the dialog box 60 without saving them.

Figure 9:
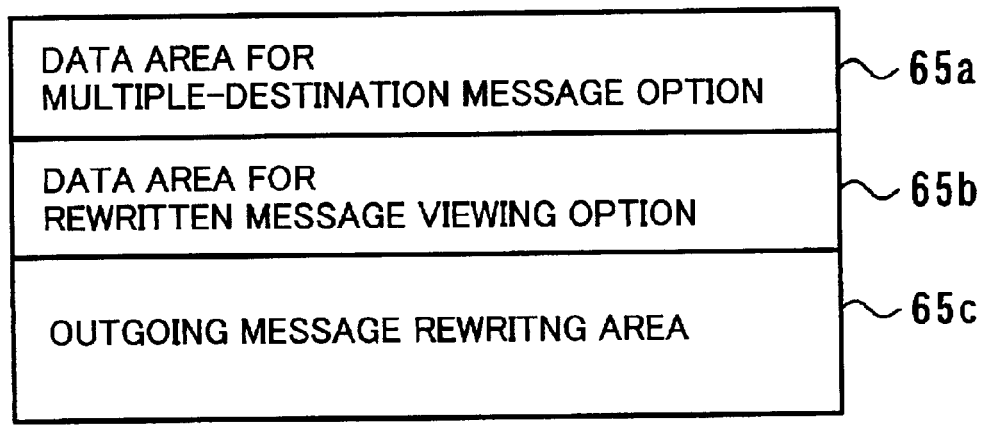
FIG. 9 shows an example of a storage area which stores several option parameters about how to handle multiple-destination messages and when to send a rewritten message.

FIG. 9 shows an option data store 65, which has previously been allocated in the HDD 10d to store the current state of the above-described options. Upon depression of the OK button 60e, the CPU 10a saves the present state of the first two check boxes 60a and 60b into a predetermined data area 65a in the option data store 65, and that of the second two check boxes 60c and 60d into another predetermined data area 65b. That is, the fist data area 65a stores the multiple-destination message option, while the second data area 65b stores the rewritten message viewing option.

Figure 10:
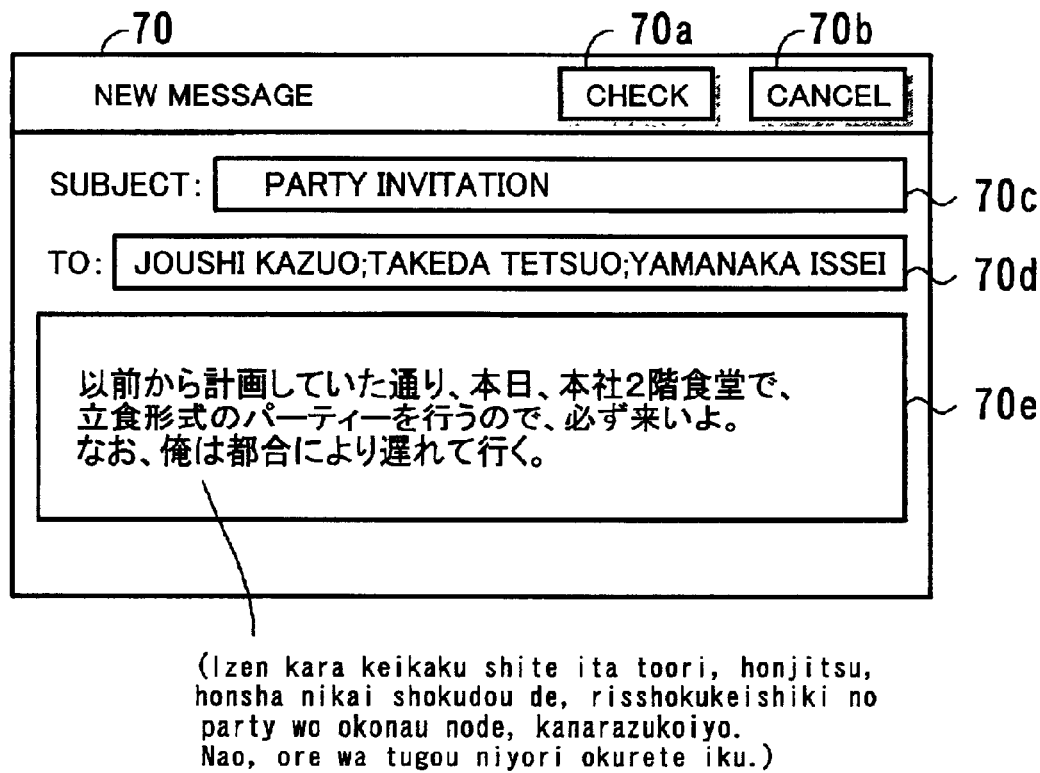
FIG. 10 shows an example dialog box that appears when the user has pressed the NEW button 30a on the window of FIG. 4 in an attempt to create a new e-mail message.

Referring back to FIG. 4, the user presses the NEW button 30a in the window 30 when he/she wishes to create a new e-mail message. This user action causes a dialog box to appear on the screen of the monitor unit 10h. FIG. 10 shows an example of this dialog box 70, which is entitled "NEW MESSAGE" and has two buttons 70a and 70b on the right-hand side of its title bar. In addition, three text boxes 70c, 70d, and 70e are arranged in the main part of the dialog box 70.

The user enters the subject of a new message to the topmost text box 70c. The destinations of this message are selected from the address book of FIG. 7 and copied to the second text box 70d. The user types the text of the e-mail message in the third text box 70e. The CHECK button 70a is used to send the created message. The user, however, would want to discard the message without sending it for any reason. The CANCEL button 70b would serve this purpose.

Suppose here that the user has pressed the CHECK button 70a after entering all the necessary information and message text with the dialog box 70 as shown in FIG. 10. In response to this user action, the CPU 10a first makes access to the text box 70d to obtain the destination addresses among others. In the present invention, the CPU 10a obtains three recipient names "Joushi Kazuo," "Takeda Tatsuo," and "Yamanaka Issei" from the text box 70d, and looks up their respective e-mail addresses in the address book of FIG. 7.

Figure 11:
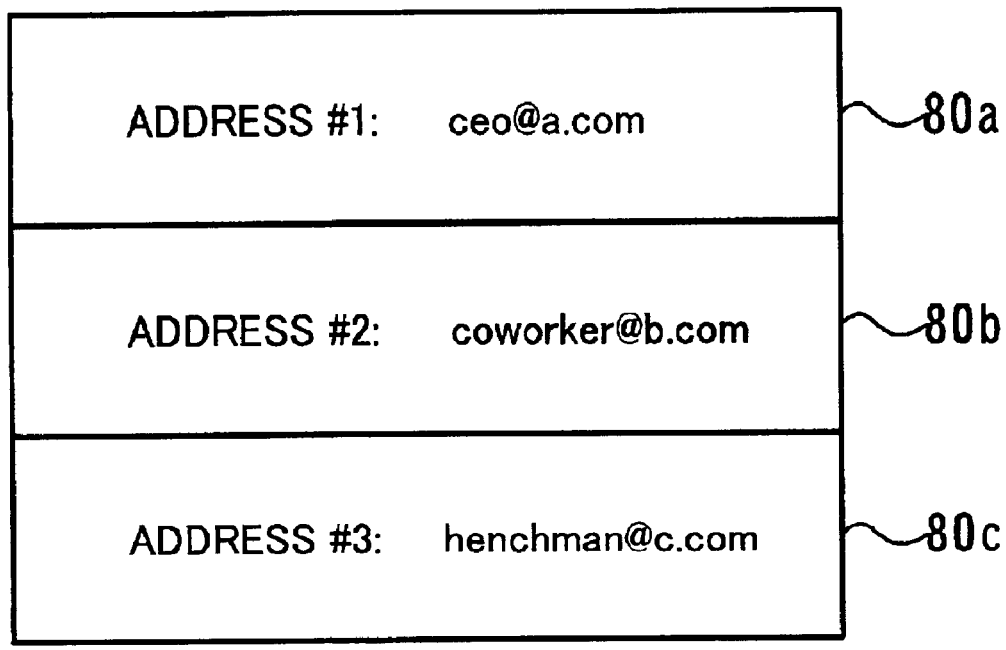
FIG. 11 shows an example of a destination address list.

Subsequently, the CPU 10a looks into the data area 65a which stores multiple-destination message option parameters. These parameters show what the user has selected in the option setting dialog box 60 of FIG. 8. Assume here that the check box 60b in that dialog box 60 is selected (i.e., the given message should be reworded in various ways according to the specified rewrite classes). In this case, the CPU 10a compares each entry of the destination address list 80 shown in FIG. 11 with the address book entries shown in FIG. 7, thereby sorting the specified destination addresses according to their respective rewrite classes. Since the three destinations have different rewrite classes in the present example, the destination address list 80 has three class sections 80a to 80c, one address entry being contained in each section. More specifically, the first section 80a contains the address <ceo@a.com> of Joushi Kazuo, the second section 80b contains the address <coworker@b.com> of Takeda Tatsuo, and the third section 80c contains the address <henchman@c.com> of Yamanaka Issei.

Figure 12:
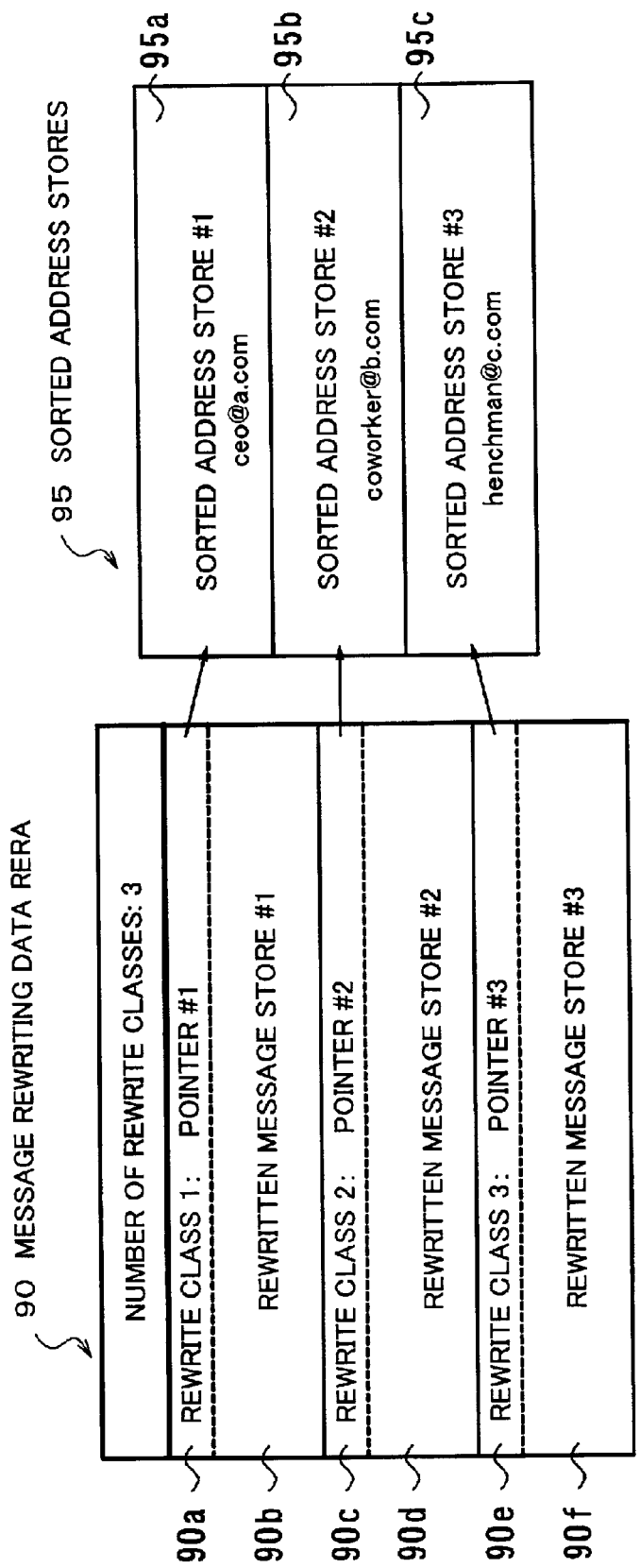
FIG. 12 shows an example of a message rewriting data area and sorted address stores.

After sorting the destinations, the CPU 10a allocates a part of the storage space of the HDD 10d to create a sorted address store 95, one for each address group. In addition, the CPU 10a creates a message rewriting data area 90 for each individual rewrite class, the area consisting of an address pointer linking to the top address of its corresponding sorted address store and a rewritten message store for accommodating a rewritten message. In the present example, the specified destinations have been sorted into three address groups each containing one destination address entry. The CPU 10a thus creates the following areas as shown in FIG. 12: three sorted address stores 95a, 95b, and 95c; three address pointers 90a, 90c, and 90e; and three rewritten message stores 90b, 90d, and 90f.

While the above arrangement is for the case where the check box 60b is selected in the OPTION dialog box 60 of FIG. 8, the user may prefer to handle a multiple-destination message in another way. As described earlier, selecting the check box 60a would let the system to apply the highest rewrite class to all the destinations being specified. If this is the case, the CPU 10a creates only one sorted address store 95a and puts all the three destination addresses into that store, as well as preparing a single set of address pointer 90a and rewritten message store 90b.

Subsequently to the above processing, the CPU 10a allocates another part of the HDD 10d to execute message rewriting tasks. This is shown in FIG. 9 as the outgoing message rewriting area 65c. The message text that the user has entered to the text box 70e in the dialog box 70 of FIG. 10 is then copied to the created area 65c.

The message rewriting process now begins with a morphemic analysis of the source message in the outgoing message rewriting area 65c, dividing the message text into its constituent elements, called "morphemes." The term "morpheme" refers to the smallest unit of meaning in a specific language, which is Japanese in the present context.

While it is an essential step in the computer processing of Japanese language text, the morphemic analysis of a Japanese sentence is not as simple as its English counterpart. As opposed to English sentences, which are composed of words delimited with single spaces, Japanese sentences are composed as a continuous series of characters. Because of the absence of delimiters, word boundaries in Japanese text are not obvious to computers. The CPU 10a divides such a Japanese source text into morphemes by using grammatical and semantic rules and Japanese word dictionaries stored in the HDD 10d.

Referring to the example of FIG. 10, the first phrase of the Japanese source message is Romanized as "Izen kara keikaku shiteita toori," where a space is inserted at every word boundary for convenience of readers. It should be noted, however, that the original Japanese text has no such spaces between words, meaning that the phrase looks more like "Izenkarakeikakushiteitatoori." The CPU 10a uses morphemic analysis techniques to resolve this phrase into the following components: "izen," "kara," "keikaku," "site," "ita," and "toori."

The CPU 10*a* then retrieves one rewrite class (e.g., class 1 in the present context) out of those in the message rewriting data area 90 shown in FIG. 12. The retrieved class is referred to herein as the "required rewrite class." Consulting a conversion table 100 of FIG. 13, the CPU 10*a* determines whether each identified morpheme of the source message is included in the table entries. In the present example (FIG. 10), the first phrase of the source message contains a morpheme "ita," and the conversion table 100 (FIG. 13) has an entry for that morpheme "ita" as an item of rewrite class 3. Since the required rewrite class is "1," the left-most morpheme entry on the same row is extracted. The CPU 10*a* substitutes this morpheme "orimashita" for the part "ita" in the source message. As a result, the first phrase "Izen kara keikaku shite ita toori" is converted to "Izen kara keikaku shite orimashita toori," which sounds more polite and formal than the original phrase.

The CPU 10*a* converts the remaining phrases and sentences in the same way, finally obtaining a message that reads as follows: "Izen kara keikaku shite orimashita toori, honjitsu, honsha nikai shokudou de, risshokukeisiki no party wo okonaimasu node, kanarazu okoshikudasai. Nao, watakushi wa tsugou niyori okurete mairimasu." The given source message is converted into a class-1 message in this way and stored in the rewritten message store #1 90*b* in the message rewriting data area 90.

Subsequently, the CPU 10*a* repeats the same for the rewrite class 2, replacing morphemes of the source message with their associated class-2 morphemes. This process yields a converted message that reads as follows: "Izen kara keikaku shite imashita toori, honjitsu, honsha nikai shokudou de, risshokukeisiki no party wo okonaimasu node, kanarazu kitekudasai. Nao, boku wa tsugou niyori okurete ikimasu." This sounds less formal than the class-1 message, but more polite than the original source message. The class-2 message obtained in that way is then saved into the rewritten message store #2 90*d* in the message rewriting data area 90.

Lastly, the CPU 10*a* executes the same for the rewrite class 3, replacing morphemes of the source message with their associated class-3 morphemes. This process yields a converted message that reads as follows: "Izen kara keikaku shite ita toori, honjitsu, honsha nikai shokudou de, risshokukeisiki no party wo okonau node, kanarazu koiyo. Nao, ore wa tsugou niyori okurete iku." Actually, nothing has changed from its original text because the sender wrote it using his/her class-3 vocabulary. The class-3 message obtained in this way is then saved into the rewritten message store #3 90*f* in the message rewriting data area 90.

Figure 14:
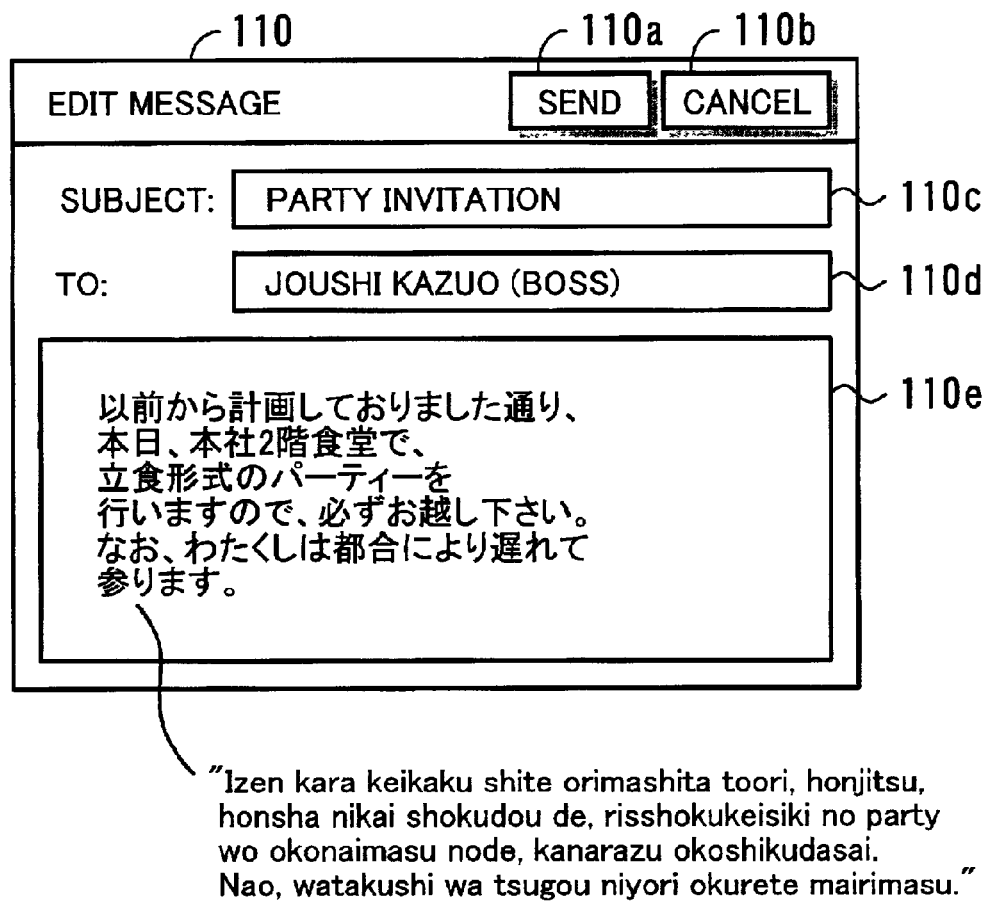
FIG. 14 shows an example of an e-mail message after being rewritten in accordance with the rules of rewrite class 1.
Figure 15:
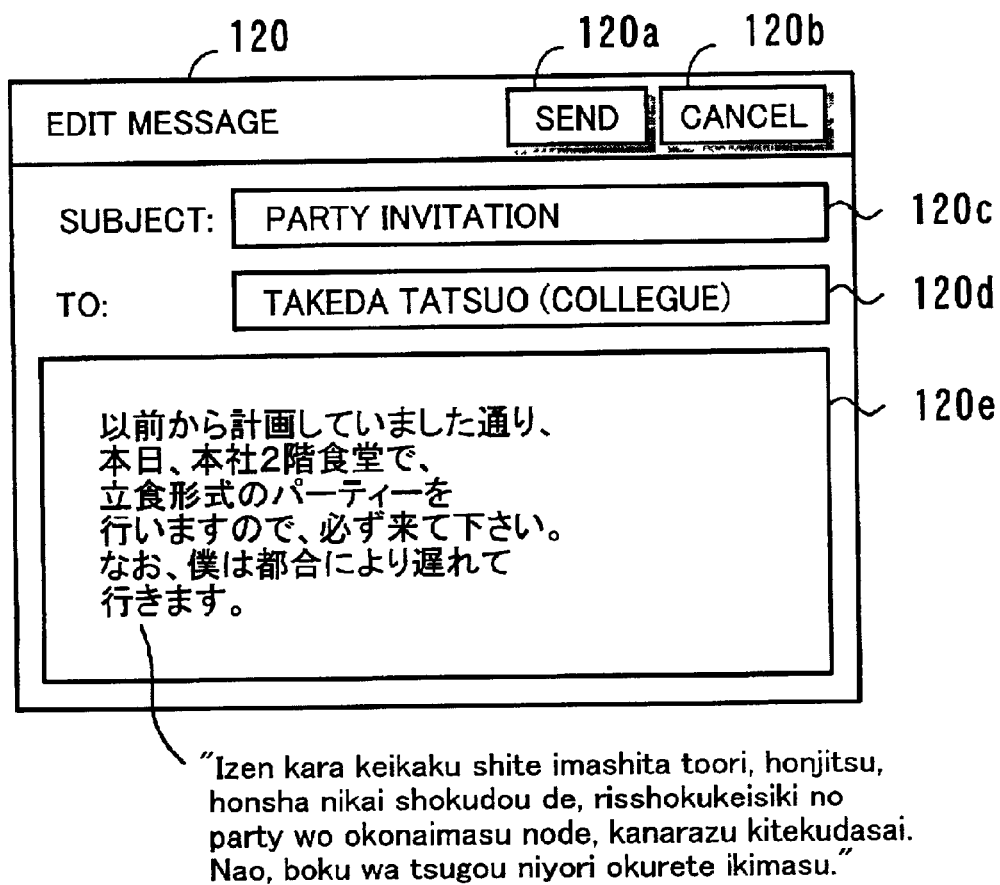
FIG. 15 shows an example of an e-mail message after being rewritten in accordance with the rules of rewrite class 2.
Figure 16:
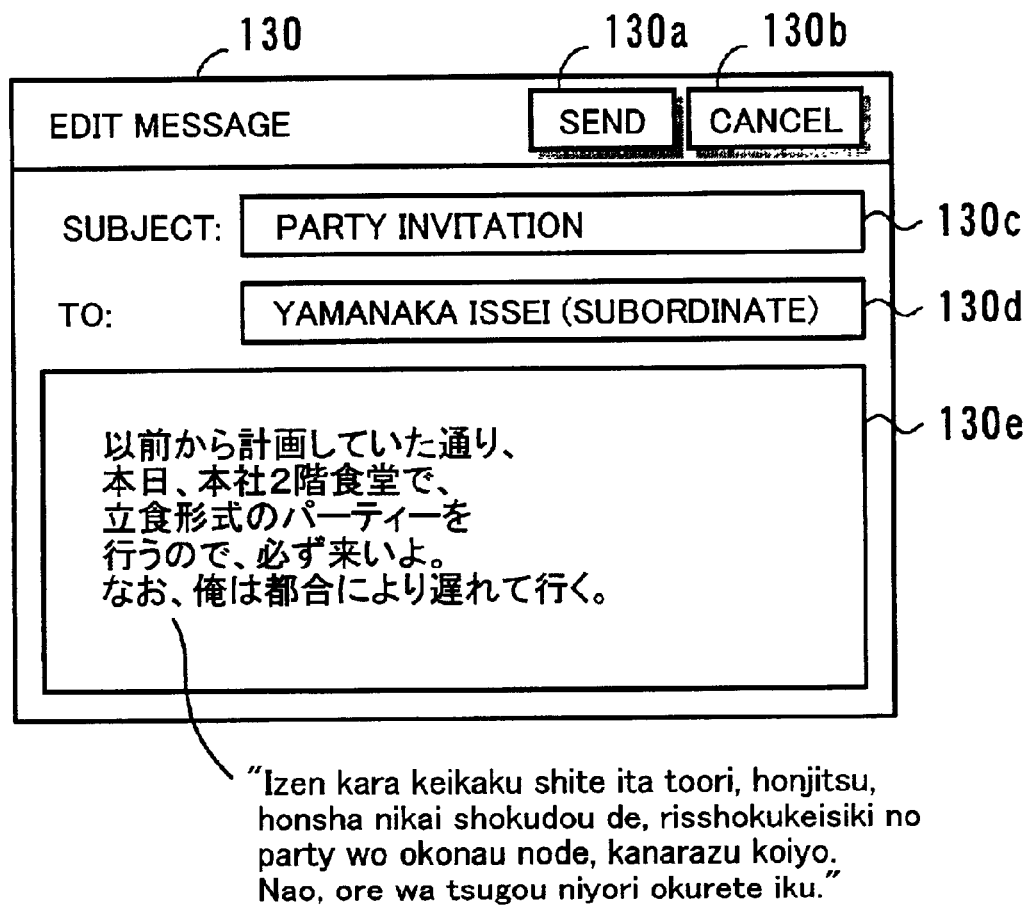
FIG. 16 shows an example of an e-mail message after being rewritten in accordance with the rules of rewrite class 3.

The above-described processing has brought three different messages for three recipients having different rewrite classes. The messages are stored in their dedicated rewritten message stores 90*b*, 90*d*, and 90*f* allocated in message rewriting data area 90. The CPU 10*a* then makes access to the data area 65*b* (FIG. 9) to examine the rewritten message viewing option, which represents which of the two check boxes 60*c* and 60*d* (FIG. 8) is selected. If the check box 60*c* is selected (i.e., if the user wishes to view and edit the rewritten message before delivery), the CPU 10*a* retrieves the converted messages from their stores 90*b*, 90*d*, and 90*f*, and creates a dialog box for each rewrite class of the retrieved messages, thus allowing the user to view and edit them. FIGS. 14 to 16 show such dialog boxes displayed on the monitor unit 10*h*.

FIG. 14 is an example dialog box for rewrite class 1. This dialog box 110, entitled "EDIT MESSAGE," contains three text boxes 110*c* to 110*e* in its main area, as well as two buttons 110*a* and 110*b* on its title bar. The first text box 110*c* shows the subject line of the message, which is the same as what is given in the text box 70*c* in FIG. 10. Optionally, this subject line could also be rewritten according to a particular rewrite class. The second text box 110*d* shows the destination(s) of the rewritten message. In the present example, this text box gives the recipient name "Joushi Kazuo" that corresponds to the e-mail address stored in the sorted address store 95*a* (FIG. 12) for rewrite class 1. The recipient name is followed by a parenthesized note that indicates his/her relationship with the sender. The third text box 110*e* shows the converted message with the wordings of rewrite class 1.

FIG. 15 shows an example dialog box for rewrite class 2. This dialog box 120, entitled "EDIT MESSAGE," contains three text boxes 120*c* to 120*e* in its main area, as well as two buttons 120*a* and 120*b* on its title bar. The first text box 120*c* shows the subject line of the message, which is the same as what is found in the text box 70*c* in FIG. 10. The second text box 120*d* shows the destination(s) of the rewritten message. In the present example, this text box gives the recipient name "Takeda Tatsuo" that corresponds to the e-mail address stored in the sorted address store 95*b* (FIG. 12) for rewrite class 2. The recipient name is followed by a parenthesized note that indicates his/her relationship with the sender. The third text box 120*e* shows the converted message with the wordings of rewrite class 2.

FIG. 16 shows an example dialog box for rewrite class 3. This dialog box 130, entitled "EDIT MESSAGE," contains three text boxes 130*c* to 130*e* in its main area, as well as two buttons 130*a* and 130*b* on its title bar. The first text box 130*c* shows the subject line of the message, which is the same as what is found in the text box 70*c* in FIG. 10. The second text box 130*d* shows the destination(s) of the rewritten message. In the present example, this text box gives the recipient name "Yamanaka Issei" that corresponds to the e-mail address stored in the sorted address store 95*c* (FIG. 12) for rewrite class 3. The recipient name is followed by a parenthesized note that indicates his/her relationship with the sender. The third text box 130*e* shows the converted message with the wordings of rewrite class 3.

The above-described dialog boxes 110 to 130 allow the user to edit the converted messages. When editing is finished, the user presses the SEND buttons 110*a*, 120*a*, and 130*a*, which causes the edited e-mail messages to be transmitted to the SMTP server 13 through the interface 10*f*. The messages are routed to POP servers local to their respective destinations. Those POP servers deliver the messages to each recipient's e-mail client system.

While the above section has described the case where the converted messages are edited before delivery, the user may prefer to send them immediately after conversion. This operation mode is enabled by selecting the check box 60*d* (FIG. 8) instead of the other check box 60*c* in the same group. If this mode is selected, the CPU 10*a* retrieves the converted messages from the rewritten message stores 90*b*, 90*d*, and 90*f* in the message rewriting data area 90 (FIG. 12), puts them into a proper e-mail format, and sends out them immediately.

The above-described embodiment of the present invention maintains recipients' addresses in association with their relationship with the sender, and based on that information, it rewrites the text of an e-mail message. This arrangement enables the sender to create an e-mail message with appropriate wordings that fit with the social relationship between the sender and recipient.

While the above-described embodiment is intended for Japanese language messages, the present invention is not restricted to any particular languages. By employing a different conversion table, the e-mail client system of the present invention can rewrite other language messages into appropriate forms. Some languages even allow the system to directly convert a source message, without the need for a morphemic analysis, unlike the Japanese language processing.

One such example of non-Japanese language applications is shown in FIG. 17. The illustrated conversion table 140 is designed to correct messages including informal abbreviations and gender-specific terms. More specifically, the upper half of the conversion table 140 contains entries about abbreviated expressions which are often used in some English-speaking Internet communities. Those abbreviations are, however, considered to be for informal use, and it is more polite to spell them out when including them in a formal message. They should also be avoided when writing to novice Internet users, because such users are not familiar with that kind of abbreviations. Gender-specific words listed in the lower half of the conversion table 140 could also be subject to correction in some cases.

The illustrated conversion table 140 has three columns to support three different rewrite classes, class 1 to class 3. The class-3 vocabulary allows the use of all informal abbreviations and gender-specific words listed. The class-2 vocabulary avoids the use of abbreviations, but allows gender-specific words. The class-1 vocabulary allows no informal abbreviations or gender-specific words.

The user previously assigns, for example, rewrite class 2 to general e-mail recipients, assuming that novice Internet users mentioned above may be included among them. Then the system will automatically spell out the abbreviations, when they appear in his/her draft message that is addressed to this category of recipients. In this way, the mechanism of the present invention can be applied to rewriting of non-Japanese messages.

Figure 18:
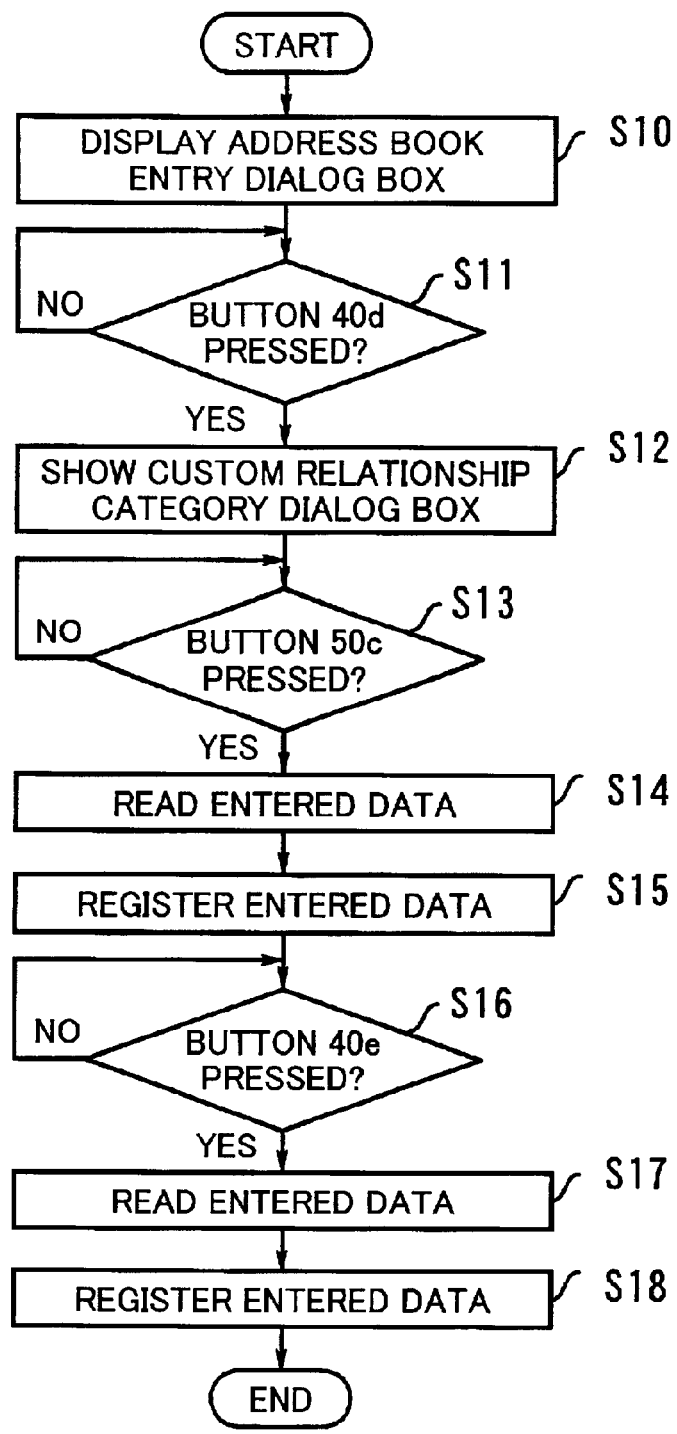
FIGS. 18 and 19 are flowcharts of processes executed in the embodiment of the present invention.
Figure 19:
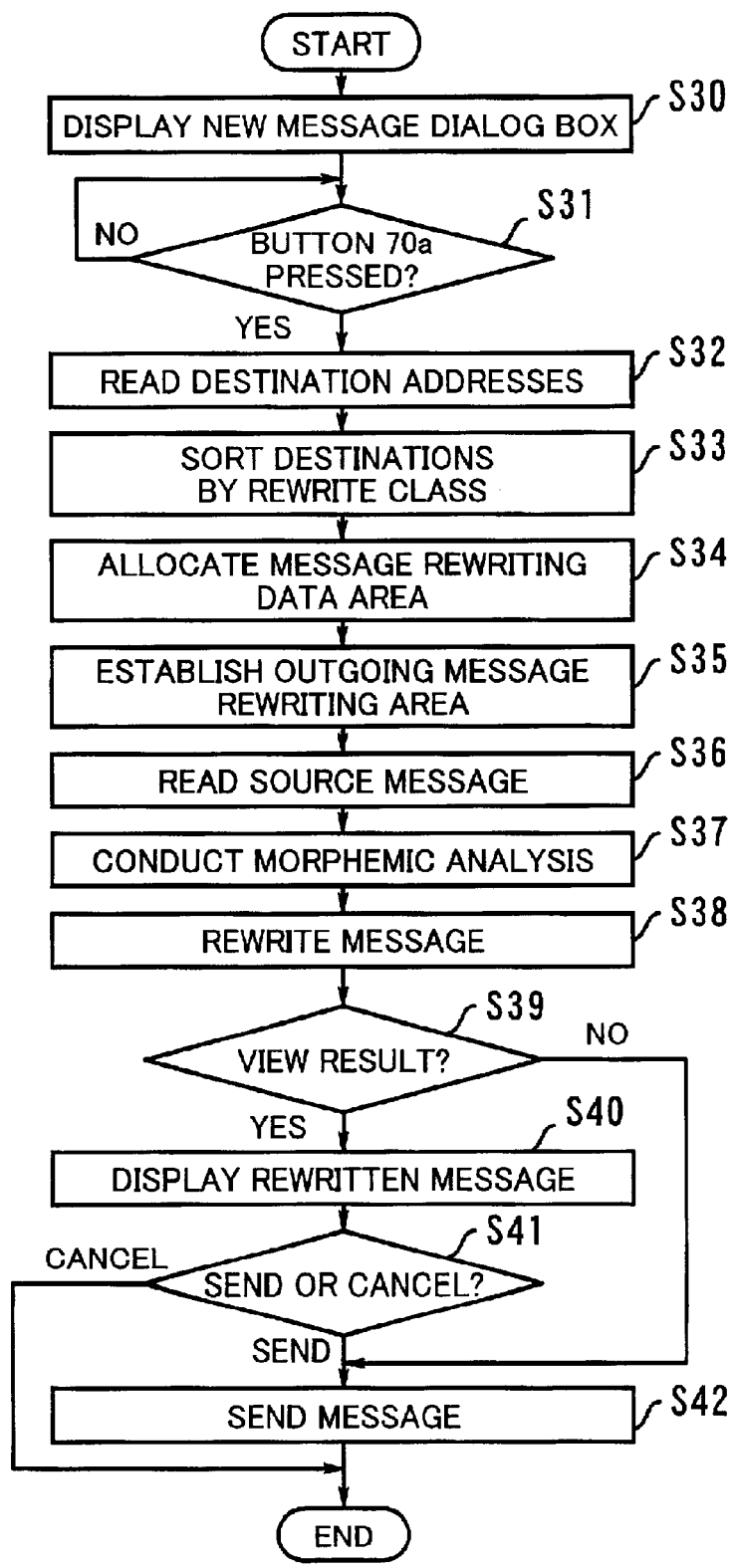

Referring next to FIGS. 18 and 19, the following section will present flowcharts of computer programs to implement the features of the present invention.

FIG. 18 is a flowchart of an address book handling process. This process, called when the user has pressed the ADDRESS button 30d on the window 30 of FIG. 4, comprises the following steps.

(S10) The CPU 10a reads out relevant data from the HDD 10d and supplies it to the graphic control card 10e, causing a dialog box 40 (FIG. 5) for management of e-mail addresses to pop up on the monitor screen.

(S11) The CPU 10a determines whether the CUSTOM button 40d in the dialog box 40 is pressed. If so, the process advances to step S12. Otherwise, the same step S11 is repeated.

(S12) The CPU 10a reads out relevant data from the HDD 10d and supplies it to the graphic control card 10e. As a result, a dialog box 50 (FIG. 6) for custom relationship category pops up on the screen of the monitor unit 10h.

(S13) The user fills out necessary data items in the dialog box 50 and signifies the completion by pressing the OK button 50c. The CPU 10a determines whether the OK button 50c is pressed. If so, the process advances to step S14. Otherwise, the same step S13 is repeated.

(S14) The CPU 10a reads out the data that the user entered in the dialog box 50.

(S15) The CPU 10a registers the data obtained at step S14 to the address book shown in FIG. 7.

(S16) The user fills out necessary data items in the dialog box 40 and signifies the completion by pressing the OK button 40e. The CPU 10a determines whether the OK button 50c is pressed. If so, the process advances to step S17. Otherwise, the same step S16 is repeated.

(S17) The CPU 10a reads out the data that the user entered in the dialog box 40.

(S18) The CPU 10a registers the data obtained at step S17 to the address book shown in FIG. 7.

FIG. 19 is a flowchart of a process of creating a new e-mail message. This process, called when the user has pressed the NEW button 30a on the window 30 of FIG. 4, comprises the following steps.

(S30) The CPU 10a displays a dialog box 70 (FIG. 10) on the screen of the monitor unit 10h.

(S31) The CPU 10a determines whether the CHECK button 70a is pressed. If so, the process advances to step S32. Otherwise, the same step S31 is repeated.

(S32) The CPU 10a reads the destination addresses from the text box 70d.

(S33) Consulting the address book, the CPU 10a sorts out the destination addresses by rewrite class and stores them into sorted address stores 95 associated with the rewrite classes.

(S34) The CPU 10a allocates a message rewriting data area 90 on the HDD 10d to each rewrite class.

(S35) The CPU 10a establishes an outgoing message rewriting area 65c (FIG. 9).

(S36) The CPU 10a reads out the source message from the text box 70e (FIG. 10).

(S37) The CPU 10a copies the source message to the outgoing message rewriting area 65c to conduct a morphemic analysis of the message text.

(S38) Using the conversion table 100 (FIG. 13), the CPU 10a rewrites the message text in accordance with each of the required rewrite classes (FIG. 12).

(S39) With reference to the rewritten message viewing option 65b, the CPU 10a determines whether to present the resultant messages for viewing and editing by the sender. If the viewing option is active, the process advances to step S40. If not, the process skips to step S42.

(S40) The CPU 10a shows the rewritten messages to the user by, for example, opening dialog boxes 110 to 130 on the screen of the monitor unit 10h.

(S41) The CPU 10a determines whether the user has pressed the SEND button 110a, 120a, or 130a in the dialog box 110, 120, or 130. If so, the process advances to step S42. If the CANCEL button 110b, 120b, or 130b is pressed instead, the dialog box is closed without sending the message.

(S42) If this step S42 is reached from step S41, the CPU 10a closes the editing session in the dialog boxes 110 to 130 and sends out the edited messages to the SMTP server 13 through the interface 10f. If it is from step S39, the CPU 10a sends out the rewritten messages to the SMTP server 13 through the interface 10f.

In the foregoing embodiments, the created e-mail messages are sent out immediately in response to the depression of a SEND button. The present invention, however, should not be limited to this specific arrangement. It is also possible to store the outgoing messages in a temporary outbox until some other user action triggers the transmission to the SMTP server. Further, while the foregoing embodiments are configured to rewrite an e-mail message that has been drafted by the user, the rewriting process may also be executed during the course of drafting.

The above-described processing mechanisms are actually implemented as software functions of a computer system. The process steps of the proposed e-mail client system are encoded in a computer program, which will be stored in a computer-readable storage medium. The computer system executes this program to provide the intended functions of the present invention. Suitable computer-readable storage media include magnetic storage media and solid state memory devices. Other portable storage media, such as CD-ROMs and floppy disks, are particularly suitable for circulation purposes. Further, it will be possible to distribute the programs through an appropriate server computer deployed on a network. The program file delivered to a user is normally installed in his/her computer's hard drive or other local mass storage devices, which will be executed after being loaded to the main memory.

The above discussion will now be summarized below. The present invention provides a computer program which sends an e-mail message to specified destinations after making the wordings used in the message more suitable for the social relationship between the sender and recipient. This feature is realized by a mechanism that maintains recipients' addresses in association with their relationship with the sender, receives a source message and its destination address, identifying the social relationship between the sender and the specified recipient, and rewrites the source message according to the identified social relationship.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A computer program product which enables a computer to send electronic mail (e-mail) messages from a sender to specified destinations, said computer program product causing the computer to function as:

address management means for managing addresses of e-mail recipients in association with the recipients' social relationships with the sender;

message data reception means for receiving a source message;

recipient identifier reception means for receiving recipient identification data which identifies at least one e-mail recipient specified as the destination;

social relation identification means for identifying social relationship between the sender and the identified e-mail recipient, by comparing the received recipient identification data with the addresses being managed by said address management means; and message rewriting means for rewriting the source message according to the social relationship identified by said social relation identification means.

2. The computer program product according to claim 1, wherein the social relationship is a relationship between the sender and the e-mail recipient in terms of positions in a social hierarchy.

3. The computer program product according to claim 1, wherein:

a plurality of e-mail recipients are specified as the destinations of the source message;

the computer program product further causes the computer to function as sorting means for sorting the plurality of e-mail recipients into groups, each of the groups sharing a common social relationship with the sender; and said message rewriting means rewrites the source message according to the common social relationship of each group formed by said sorting means.

4. A computer-readable medium storing a program which sends electronic mail (e-mail) messages from a sender to specified destinations, the program causing a computer to function as:

address management means for managing addresses of e-mail recipients in association with the recipients' social relationships with the sender;

message data reception means for receiving a source message;

recipient identifier reception means for receiving recipient identification data which identifies at least one e-mail recipient specified as the destination;

social relation identification means for identifying social relationships between the sender and the identified e-mail recipient, by comparing the received recipient identification data with the addresses being managed by said address management means; and message rewriting means for rewriting the source message according to the social relationship identified by said social relation identification means.

5. A method of sending electronic mail (e-mail) messages from a sender to specified destinations, comprising the steps of:

(a) managing addresses of e-mail recipients in association with the recipients' social relationships with the sender;

(b) receiving a source message;

(c) receiving recipient identification data which identifies at least one e-mail recipient specified as the destination;

(d) identifying social relationships between the sender and the identified e-mail recipient, by comparing the received recipient identification data with the addresses being managed at said step (a) of managing the addresses; and (e) rewriting the source message according to the social relationship identified at said step (d) of identifying the social relationships.

* * * * *